UNITED STATES PATENT OFFICE.

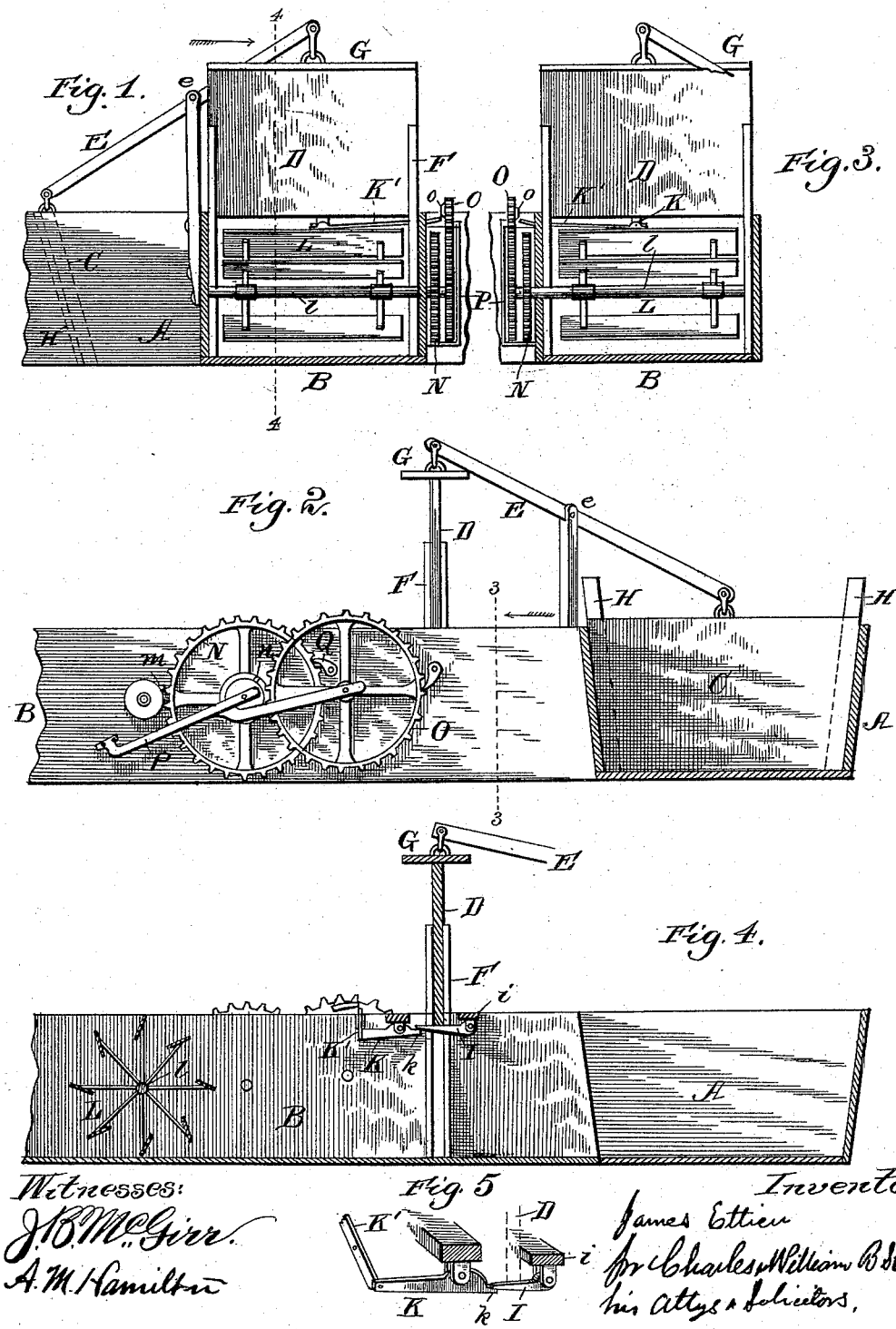

JAMES ETTIEN, OF UTICA, MONTANA.

IRRIGATING HEAD-GATE.

SPECIFICATION forming part of Letters Patent No. 474,549, dated May 10, 1892.

Application filed November 3, 1891. Serial No. 410,780. (No model.)

*To all whom it may concern:*

Be it known that I, JAMES ETTIEN, a citizen of the United States, residing at Utica, in the county of Fergus and State of Montana, have invented certain new and useful Improvements in Irrigating Head-Gates; and I do hereby declare the following to be a full, clear, and exact description of the invention, such as will enable others skilled in the art to which it appertains to make and use the same.

My invention relates to water-gates and devices for automatically operating them, it being particularly intended for use in irrigating operations, its purpose being to automatically control the flow of water through a ditch, sluice, or other conduit by means of a motor, which is operated by the water flowing through such conduit and is connected with the gate which controls the supply of water to the conduit in such manner that the gate will be closed and the supply of water cut off after a sufficient amount has passed the gate; and it further consists in a particular mechanism which I have devised for carrying out the objects of my invention in the most complete and perfect manner now known to me.

In the drawings wherein is illustrated the preferred form of my invention, Figure 1 is an end view of the apparatus looking toward the open or discharge end of one of the sluices or water-ways. Fig. 2 is a side view of the apparatus. Fig. 3 is a section on the line 3 3 of Fig. 2, looking in the direction of the arrow. Fig. 4 is a section on the line 4 4 of Fig. 1, looking in the direction of the arrow.

In irrigating land it is customary to construct a canal or ditch along the higher portion of the piece of land which is to be irrigated, such ditch or canal being termed the "head-ditch." From this head-ditch are led off the side ditches or water-ways through which the water is distributed over the land. As the water is used intermittently, the side ditches are provided with gates to control the flow of water from them, the gates being left open a sufficient length of time to allow the requisite amount of water to pass.

As the side ditch is ordinarily not large enough to carry a supply of water sufficiently large to permit the requisite flow from all of the overflow or discharge sluices at one and the same time, it is customary to place water-gates in the ditch, so that the water may be cut off from all but one or two or any other number of the sluices which it is desired should be used at once. It has therefore been customary to open these various water-gates by hand, and from this it followed that either night shifts or gangs of men were necessarily employed to attend to the gates during the night season, so that the full supply of water might be utilized, or else there was a large waste of water, it being impossible to utilize that which flowed at night without employing such night-shifts of attendants.

By the use of my invention I am enabled to greatly reduce the number of attendants required to attend to the irrigating of any given tract of land and at the same time to utilize in the most perfect and economical manner the entire supply of water available.

In the drawings, A designates the ditch, and B a side discharge way or sluice, these parts being of any suitable size relative to each other.

C represents a water-gate situated transversely across the ditch, and D a water-gate controlling the flow of water through the sluice. These two gates are preferably connected so that they shall be operated simultaneously, one gate being raised or open when the other is lowered or closed. To secure this simultaneous operation of the two gates, I connect them to the opposite ends of a lever E, fulcrumed in a support *e*, situated between the two gates. The gate D slides preferably in ways F, situated on the inner walls of the box which constitutes the sluice B, and is provided at its upper end with a platform G or other suitable support for weights which may be placed there to insure the closing of the gate.

I prefer that the side walls of the ditch shall flare slightly toward the top and that the gate C shall be shaped so as to fit and completely close the ditch when let down. This insures that the gate shall rise easily and reduces the danger of binding or becoming stuck. Instead of mounting this gate in ways, as I do the gate D, I prefer that when closed it shall rest against cleats H, situated on the lower side only of the gate. These cleats preferably incline slightly downward or in the direction of the current through the ditch, as I have found that the gate rises more freely and easily when they are thus placed than when they are vertical or are inclined toward the higher levels of the ditch. The reason for this is that the lever E, when in the position shown in Fig. 1—that is, with the gate C down and the gate D elevated—is inclined downward somewhat toward the gate C, and if, under these circumstances, the cleats H were inclined up the ditch A and the lower edge of the gate were covered with mud, as is sometimes the case, the gate C would bind against the upper ends of the cleats and perhaps be held down when the lever began to tilt to raise the gate, whereas when the cleats are inclined down the ditch the tendency is to draw the gate away from them and leave it perfectly free to rise. This construction and mounting of the gate in the ditch is very essential, because it is intended that it shall be opened automatically and during the absence of attendants, and great damage would result should it fail to rise at the proper time.

In connection with the gate D in the sluice I employ a latch for holding it open and a trip operated by the flow of water through the sluice for releasing said latch and permitting the gate to close. The latch consists, preferably, of a finger I, pivotally secured to a rest or support, such as the cross-bar $i$. This finger is held across the lower edge of the gate D, which latter it supports, its free end being adapted to rest upon the shoulder $k$ of a lever K, which lever serves as the trip for the latch.

L represents a paddle-wheel situated in the sluice and adapted to be operated by the water flowing through it. The shaft $l$ of this paddle-wheel is at or near one end provided with a cog or tooth $m$, arranged so as to engage with the teeth of the wheel N, the shaft or axle of which is also provided with a single cog or tooth $n$. This latter cog engages at each revolution with one of the teeth of a wheel O, which latter has upon the inner face of its rim a cam or projection $o$, arranged so as to engage with and move the outer end of the trip-lever K'. The wheels N and O are mounted upon the outside of the box which constitutes the sluice, a guard or bracket-piece P serving to support the outer ends of their shafts. They are provided with ratchets or dogs Q to prevent them from turning backward.

The operation of the device may now be understood. The attendant sets the parts in the position shown in Fig. 1 with the gate C closed and gate D opened, thus cutting off the water from the lower portions of the ditch and directing it into the sluice, through which it flows upon the land. As soon as the water begins to flow through the sluice the paddle-wheel L is revolved and at each revolution turns the wheel N a short distance. At each revolution of the wheel N the wheel O is turned forward a distance equal to that between two adjacent teeth, and this continues until the projection $o$, carried by the latter wheel, operates the trip-lever, which on being tilted releases the latch that holds open the side gate. When this gate is released, its weight, together with the load upon the platform G, causes it to fall and shut off the water from the sluice and at the same time lifts the gate C in the ditch. This permits the water to flow on through the ditch to the next sluice, where there is situated a similar automatic gate-operating device, which operates in the manner already described, and so on to the end of the series of sluices. The ordinary flow of water through the sluice will cause a complete revolution of the wheel O in a given time—say, four hours. The water can therefore, under these circumstances, be allowed to flow uninterruptedly through the sluice for four hours before it is cut off. It will often happen, however, that the water should run for a less period of time, and in such case it is only necessary to set the wheel O so that it will have to make less than a complete revolution, the proportion of the revolution it has to make being to the complete revolution as the length of time the water is required to run is to four hours.

It will be evident that the automatic gate-operating device which I have described can be used in connection with a single gate controlling the flow through the sluice, the connection with the gate C, situated in a ditch, as shown in the drawings and heretofore described, being for the purpose of illustrating the invention used where the supply of water is limited and the entire amount is utilized.

While I have shown a sliding gate operated by gravity, it is evident that the same devices could be used in connection with a horizontally-sliding gate operated by a spring or other force, and it is also evident that my invention may be applied to a swinging as well as to a sliding gate.

The attendant can set any number of these gates, some being arranged to run longer than others, and can then leave them to operate themselves, and each gate will operate in turn, shutting off the supply of water when the sufficient amount has run upon the land and turning on the water through the next sluice below, thus securing absolute uniformity of operation without personal attention after the gates have been properly set.

Without limiting myself to the precise construction and arrangement of parts shown, what I claim is—

1. In combination with a gate adapted to control the supply of water through a conduit, a catch which holds the gate, and a trip operated by the flow of water through the conduit for operating the catch to release the gate, substantially as shown and described.

2. The combination of a sliding water-gate situated in a conduit, means which tend normally to close the gate, a catch for holding the gate open, and a trip operated by the flow of water through the conduit for releasing the catch and permitting the gate to close, substantially as shown and described.

3. The combination, with a water way or conduit, of a gate controlling the flow through the same, a catch for holding the gate, a trip for releasing the catch, a wheel operated by the flow of water, and a connection between the wheel and the trip, whereby the former operates the latter and frees the gate, substantially as shown and described.

4. The combination, with a water way or conduit, of a sliding gate which controls the passage of the water through it, a catch adapted to hold the gate open, a trip for the catch, a paddle-wheel situated in the conduit to be operated upon by the water, and a train of gearing operated by the paddle-wheel and adapted to operate the said trip, substantially as shown and described.

5. The combination, with a water way or conduit, of a sliding gate which controls the passage of the water through the conduit, a latch adapted to lie across the edge of the gate and hold it open, a notched lever upon which the latch catches, and by which it is held, a paddle-wheel situated in the conduit, and a train of gearing operated by the said paddle-wheel and provided with a projection which engages with and operates the said lever to trip the latch and permit the gate to shut off the water, substantially as shown and described.

6. The combination, with a main and a branch or side water way or conduit, of two water-gates, one in each of the said waterways, connected together so as to act alternately to open and close the respective waterways, and a motor operated by the water passing through the branch water-way and controlling the movements of the said gates, substantially as shown and described.

7. The combination, with a main and a branch or side water way or conduit, of two sliding water-gates situated, respectively, in the said water-ways to control the flow of water through them, a lever connecting the two gates, whereby when one closes the other opens its water-way, and vice versa, a motor operated by the water flowing through the branch or side water-way, a latch for holding the gates in a certain position, and a trip operated by the said motor for releasing the said latch, substantially as shown and described.

8. The combination, with the ditch A and the sluice B, of a water-gate in the ditch, the weighted gate D in the sluice, the lever E, to the opposite ends of which the said gates are hung, the latch adapted to support the gate D, while the gate in the ditch remains closed, a trip for this latch, and a motor operated by the flow of water through the sluice to operate said trip, whereby the gate D closes and the other gate is opened, substantially as shown and described.

9. The combination, with a ditch or waterway having side walls flaring toward the top, of a water-gate fitting across the said ditch, the cleats H, against which the gate rests, inclined down the ditch—that is, in the direction of the current—and means for lifting the said gate, substantially as shown and described.

In testimony whereof I affix my signature in presence of two witnesses.

JAMES ETTIEN.

Witnesses:
BREATHITT GRAY,
G. F. WILLIAMSON.